United States Patent
Cohen et al.

(10) Patent No.: US 10,110,741 B1
(45) Date of Patent: Oct. 23, 2018

(54) DETERMINING AND DENYING CALL COMPLETION BASED ON DETECTION OF ROBOCALL OR TELEMARKETING CALL

(71) Applicant: TelTech Systems, Inc., South Amboy, NJ (US)

(72) Inventors: Meir Cohen, South Amboy, NJ (US); Eli Finkelman, South Amboy, NJ (US)

( * ) Notice: Subject to any disclaimer, the term of this patent is extended or adjusted under 35 U.S.C. 154(b) by 0 days.

(21) Appl. No.: 15/658,502

(22) Filed: Jul. 25, 2017

(51) Int. Cl.
| H04M 1/64 | (2006.01) |
| H04M 3/436 | (2006.01) |
| H04M 3/42 | (2006.01) |
| H04M 3/527 | (2006.01) |
| G10L 15/26 | (2006.01) |
| G10L 25/51 | (2013.01) |

(52) U.S. Cl.
CPC ........... H04M 3/436 (2013.01); G10L 15/265 (2013.01); G10L 25/51 (2013.01); H04M 3/42221 (2013.01); H04M 3/527 (2013.01); H04M 2203/306 (2013.01)

(58) Field of Classification Search
CPC .................................................... H04M 3/436
USPC .......... 379/73, 88.12, 88.14, 114.13, 142.06, 379/210.02; 455/415; 704/275
See application file for complete search history.

(56) References Cited

U.S. PATENT DOCUMENTS

| 9,521,252 | B2* | 12/2016 | Leeds | H04M 3/02 |
| 2004/0006478 | A1* | 1/2004 | Alpdemir | G06Q 30/02 704/275 |
| 2011/0170680 | A1* | 7/2011 | Chislett | H04M 3/436 379/142.06 |
| 2012/0015639 | A1* | 1/2012 | Trivi | H04M 3/436 455/415 |
| 2015/0172460 | A1* | 6/2015 | Foss | H04M 3/436 379/210.02 |
| 2016/0360036 | A1* | 12/2016 | Ansari | H04M 3/436 |
| 2017/0134575 | A1* | 5/2017 | Quilici | H04M 3/436 |
| 2018/0013881 | A1* | 1/2018 | Cooper | H04M 3/2281 |

* cited by examiner

*Primary Examiner* — Md S Elahee
(74) *Attorney, Agent, or Firm* — Michael J. Feigin, Esq.; Feigin and Fridman LLC (57) ABSTRACT

A system and a method for handling an incoming call, comprising the steps of determining that the incoming call is an unwanted call, locating at least one prior call wherein characteristics of a calling party in the at least one prior call match that of the unwanted call, determining an audio response which kept the calling party in the prior call longest, and playing, at least in part, the audio response which kept the calling party in the prior call longest in the unwanted call.

16 Claims, 4 Drawing Sheets

DETERMINING AND DENYING CALL COMPLETION BASED ON DETECTION OF ROBOCALL OR TELEMARKETING CALL

FIELD OF THE DISCLOSED TECHNOLOGY

The disclosed technology relates generally to telephone switches and, more specifically, to customized call routing.

BACKGROUND OF THE DISCLOSED TECHNOLOGY

Robocalls or robocalling is defined as a phone call that uses a computerized autodialer to deliver a pre-recorded message. Robocalls are often associated with political and telemarketing campaigns, though there are other uses such as public service or emergency announcements. Such calls are generally unwanted and generally violate the United States "do not call" registry, or skirt the registry by being a political phone call or by having a prior business relationship with the called party. When unwanted, as is the case of most robocalls, such calls waste many thousands of hours of people's time. Despite being punishable by fine, or through loopholes in such regulations, the calls persist, to the annoyance of almost everyone with a telephone. Specifically, many people greatly dislike telemarketing calls which try to sell them products or services, or to convince the to switch from one service provider to another, as these calls are typically unwanted, the telemarketers are often pushy and ask intrusive questions, and in general these calls waste the time of the called party.

While other solutions also exist, secondary considerations show that the problem remains unsolved. On Oct. 18, 2012, the Federal Trade Commission, a part of the U.S. federal government created the "robocall challenge" to try and develop, from the public, a way to stop robocalls. Further, the Federal Communications Commission has a dedicated guide to robocalls and increasingly tightens federal regulations on making such calls. Thus, it is clear that this is an unsolved need in the prior art with no obvious solution known, as of the priority filing date of this application.

SUMMARY OF THE DISCLOSED TECHNOLOGY

A method of receiving a call in embodiments of the disclosed technology works by first determining that a call is an unwanted call or a call from a telemarketer. The terms "unwanted call" and "telemarketer" are used interchangeably to include robo-callers (those who call with recorded messages), cold callers (those who call to advertise or sell services), those who hope to monetarily gain by calling a phone number, and the like. Such calls also include, in embodiments of the disclosed technology, any unwanted caller as determined by the called party before or during a call based on a determination made en grosse (e.g. any caller at a certain time, from a certain area code, or who says a certain keyword) or individually per call. A person can indicate a call is unwanted by pressing a button on a screen or phone which has been pre-programmed to be an indication of same or it can be determined based on the number of the calling party (using calling line identification ("caller ID") or automated number identification ("ANI"). Further, such a determination can be made by comparing audio, in part, or audio signatures between a present call and a prior call which was indicated as being from a telemarketer or unwanted.

Once a call is received and determined to be unwanted, then at least one prior call is located and compared to the present call based on their respective characteristics of the call or calling party. Then, an audio response is played into the call to the calling party based on which audio response will keep the calling party on the phone longest. If only one recording is available, it will be played and this is considered to be an audio response which will keep the calling party on the line the longest and the step of comparing will be considered to have been satisfied. When there are multiple audio recordings to choose from, one is chosen based on trial and error or overlapping of voice signatures/audio/text transcript (using a speech to text recognition engine, in real-time) or otherwise between the two calls. Especially if the calling party is identified to be the same between two calls, the audio from a first of the two calls will be used on the second in embodiments of the disclosed technology. The audio played can be looped over and over to the calling party. "Real-time" for purposes of this disclosure is defined as, "as fast as processors used to carry out the act are able to provide the results" and/or "while a call is active such that the results can be used to provide data into audio of the call."

In some embodiments, a calling party prompts the called party to enter a number to reach a live operator. As such, where a text transcript is created this can be determined based on interpreting an instruction to "press 1" or the like. Upon receiving and interpreting such an instruction, a DTMF (dual tone multi-frequency) tone corresponding to the number that one is instructed to press by the calling party is sent to the call.

The audio played to the unwanted caller can be actual audio from a prior phone call from this or another unwanted caller. Audible interactions (audio generated between a calling party and called party) of at least one prior phone call can be recorded. Then, in some embodiments of the disclosed technology, it is this audio which is used in the step of "playing" described above. That is, the prior recorded audio (generated by the called party only) from an actual phone call is played into another call determined to be unwanted, in embodiments of the disclosed technology.

Said another way, in embodiments of the disclosed technology, a telemarketer is kept on the phone as long as possible by playing a "robo-answer" as a countermeasure to a robocall or even a live operator telemarketer as a calling party to a telephone call. Multiple conversations between calling parties who are indicated to be telemarketers and called parties are recorded (which includes recordings of simulated called parties, e.g. the recording is of a called party to a hypothetical phone call). Then another phone call is received and determined to be from a telemarketer. The recorded audio of a called party is then played into this another phone call.

The audio chosen to be played into the another phone call is selected from a plurality of such recorded audio based on which is deemed most likely to keep the telemarketer of the another phone call communicating within the phone call for a longest amount of time. The more time it takes per call from a telemarketer and the less reward (and more annoyance) the less likely a telemarketer is likely to make future calls. Audio determined to be most likely to keep the telemarketer of the another phone call communicating for the longest amount of time is determined based on one or a plurality of a match between an audio signature of the calling parties and/or accumulated statistics (at least three calls where the audio was used) of call length for a particular recoded audio of one of a called party of said called parties.

The recorded audio comprises, or audio played additionally includes, playing a DTMF tone after it is determined, by way of converting audio of a calling party in the another phone call to text, that the calling party in the another phone call has requested a DTMF tone to reach a live operator. This determination can alternatively be made by determining that the calling party is the same as a prior calling party and playing the DTMF tone at the same time within the second call as within the prior call, or simply by playing the same audio of the called party in the second (another) phone call. In yet other embodiments, such as where it is determined that the calling party is a robo-caller (recorded call without live operator) the audio of a prior recorded phone call is only played after using the DTMF tone to reach a live operator. Once the DTMF tone is exhibited into the audio of the phone call and a live operator is reached, then recorded audio of a person speaking is played to the live operator in such an embodiment.

The above embodiments are carried out using a phone network switch in yet further embodiments of the disclosed technology. A phone network switch is a device with network nodes on a phone network which acts as a hub to send and/or receive phone calls. Such a phone network switch is used to keep telemarketers on a phone connection as long as possible and has an input receiving a plurality of phone calls, a call analysis engine determining which of the plurality of phone calls are from telemarketers (in some cases, this can be a determination that some or all calls received are from telemarketers), and a call recording mechanism recording audio of the phone calls. Separate audio (also referred to as a "separate audio file" for audio of called parties to the phone calls is stored for at least some of the phone calls. An audio playback mechanism is used to play back audio of a called party of the called parties from one phone call of the plurality of phone calls in a new call determined to be from one of the telemarketers.

Specific audio of a phone call of the plurality of phone calls is played back to a calling party of the new call based on a prediction that the specific audio will cause the calling party of the new call to remain on a telephone call longer than other audio which has been recorded by the call recording mechanism. Sometimes, the device starts with a single audio recording and so has only this audio to playback, and in other cases, no prior data is known which can be used to decide which audio to use in a new phone call. In such a case, a guess is made or round robin approach is used until more data about call length of the new call and subsequent calls is known where recorded audio was used to play the part of the called party.

The prediction can be made based on various attributes of the calling party transmitted to the phone network switch which are comparable or most comparable to a prior call or calls of the plurality of phone calls including Caller ID, ANI, time of day, day of the week, and other data. In addition to, or instead of, basing which audio to play on the attributes of the calling party, the audio played can be based on attributes of the call audio itself. This is done, in some embodiments, by taking a voice fingerprint and comparing or by making a text transcript of the call and comparing. In a text transcript, keywords can be compared (e.g. "warranty", "free cruise", and so forth).

A DTMF tone generator can be used, or a recording of a DTMF tone can be played, in response to a request for same by a calling party. This can be done in response to a determination, such as based on the output of a speech to text, that a request to enter a number has been made by the calling party, and can be in combination with a detected keyword prior such as "press 2 now to speak to a representative."

Further to the above, the input receiving a plurality of phone calls receives at least some of the plurality of phone calls by way of call forwarding from third parties who forward the at least some of the plurality of phone calls as a result of indicating that a call is from a telemarketer. This may be by pressing a button which generates a DTMF tone on their phone or a button in a software application which indicates that the call is from a telemarketer (or unwanted) which causes the phone call to be forwarded to the phone switch of embodiments of the disclosed technology. The call analysis engine uses the receipt of such indication data to determine that a call is from a telemarketer in some embodiments of the disclosed technology.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

The disclosed technology described herein provides devices and methods for preventing the receipt of unwanted robocalls or telemarketing calls. This is accomplished by determining if the calling party is an unwanted call or a call from a telemarketer. If not, then the call is connected to the called party. Once connected, the called party may indicate that the call was/is unwanted and should be disconnected. Then, the call is disconnected from the called party while being maintained with the switch. The call is also recorded in embodiments of the disclosed technology, with the audio therefrom, or audio signature, being used to detect future unwanted calls.

Embodiments of the disclosed technology are described below, with reference to the figures provided.

Figure 3:
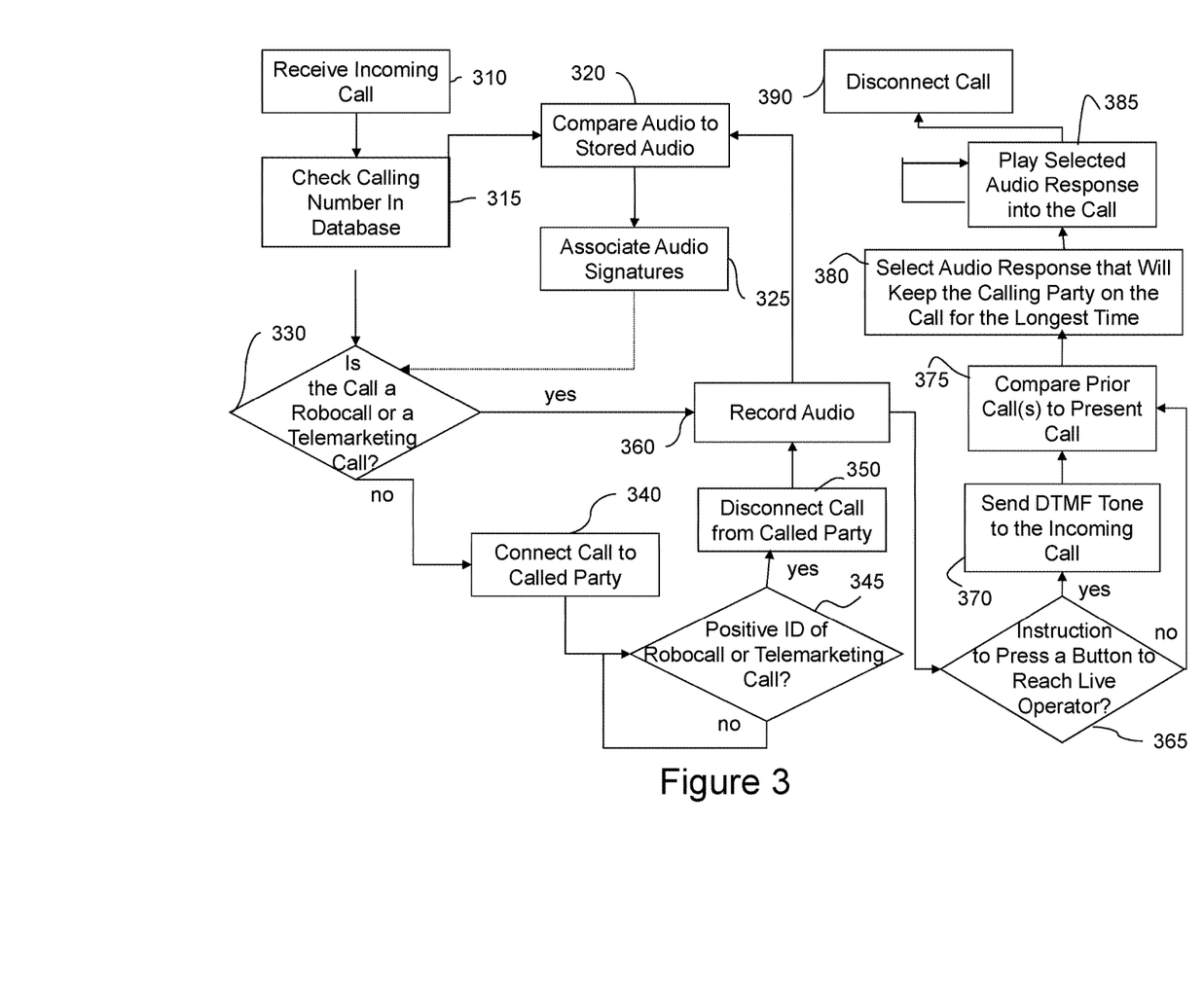
FIG. 3 shows a flow chart of a method of the disclosed technology, as carried out by an intermediate switch.

FIG. 3 shows a flow chart of methods of the disclosed technology, as carried out by an intermediate switch. A switch is defined as a device which, at least, receives and routes telephone calls. A switch may also create and disconnect electrical connections between two devices on a phone network, may record a phone call, may receive/send and interpret DTMF tones or voice prompts, and so forth. Further, when used in this disclosure, a "switch" may include one or more separate devices which are electrically connected, or which exchange data with each other over a network to carry out steps disclosed in the claims of this patent application.

Such a switch, as defined above, receives an incoming call in step 310. This call is designated for a target-called party, such as based on a phone number of the called party (a SIP ID or other equivalents should be understood as being within the concept of "called party," where a SIP ID is a session interface protocol.) Before forwarding the call to the intended recipient/called party, the call is routed within a switch or intermediate switch designated by the called party and/or controlling receipt of phone calls to be passed to the called party. In embodiments of the disclosed technology, the phone number of the calling party is checked in step 315, based on the ANI (automated number identification) or Caller ID (calling line identification) information. In embodiments of the disclosed technology, the call is answered by the switch at this point, and a continued ringing sound is played to the calling party, a greeting, a request for a name to be stated, or the like. Meanwhile, when answering the call, the audio received from the calling party is compared to prior stored audio in step 320. This includes a database lookup of audio, based on the determined caller number or other factors to determine whether the calling party is a robot or a telemarketer. In step 325, where audio signatures are stored, the audio signatures (or fingerprints) are compared to further determine, in step 330, if the call is an unwanted robocall or telemarketing call.

Before continuing the description of the figure, it should be understood that an "audio signature" or "audio fingerprint" is a term of art defined as a condensed digital summary, deterministically generated from an audio signal, that is used to identify an audio sample or to quickly locate similar items in an audio database. Perceptual characteristics, how the audio sounds to a human listener, may be used in comparing audio fingerprints in step 380, such as average zero crossing rate, estimated tempo, average spectrum, spectral flatness, prominent tones across a set of bands, and bandwidth.

Either after step 315 and/or step 325 (which may occur concurrently), based on a comparison of audio signatures and calling number (and other factors, which will be described below), it is determined in step 330 if the call from the calling party is a robocall or a telemarketing call. A robocall or telemarketing call may be identified by the phone number from which the call is received, or by "catch phrases" used in such calls. In the context of the present application, a "wanted" call is one which is identified as being previously verified as a real caller with lack of any indication from the called party that such a caller is unwanted. If it is determined that the call is not a telemarketing call or a robocall, i.e. the call is either of an unknown quality or is "wanted," then the call is connected to the called party in step 340.

Once the call is connected to the called party, in step 345 the called party may positively identify the call as being unwanted. As such, a command from the called party may be configured, before the start of the call, to designate a caller as unwanted. Until this is done, the checking for same loops back into step 345. Once a positive identification of a robocall or telemarketing call is made, such as by entering specific codes on a keypad (such as the "#" key or "999"), saying a specific phrase (such as "put me on your 'do not call' list" or "please tell me more about what you have to offer"), or passing a command to the telephone switch through another mechanism, then step 350 is carried out, whereby the call is disconnected from the called party but maintained by the telecommunications switch.

However, if the call is unwanted (as determined either automatically at step 330 or by positive identification of the called party at step 345), then the call is recorded at step 360. The recording may be used in order to obtain an audio signature or audio for recognizing future calls from such a caller, in order to identify an instruction from the calling party to the called party, or in order to create a database of phone calls for playing to future calls, as described in further detail hereinbelow. In embodiments of the disclosed technology, a call, or all calls, received in step 310 may be recorded from beginning to end, the audio discarded if the call is completed successfully (meaning, it is recorded until step 340 of connecting to the called party, or it is recorded until disconnected entirely from the telecommunications switch). That is, when the call is a "wanted" call, the call is either not recorded, or the recording is deleted if the call is completed without a positive ID from the called party that the call was/is unwanted. Further, only audio signatures are retained in embodiments of the disclosed technology. In yet further embodiments, a called party may pre-select which portions of calls he or she wants recorded.

In some embodiments, the recording is interpreted to determine whether or not the calling party prompts the called party to reach a live operator at step 365. This may be carried out by transcribing the voice recording of the call, and identifying in the transcript an instruction such as "press 1 for a representative" or the like. Upon receiving and interpreting such an instruction, at step 370 a DTMF (dual tone multi-frequency) tone corresponding to the number that one is instructed to press by the calling party is sent to the incoming call. Alternately, if the calling party is determined to be the same as that of a prior calling party, a DTMF tone may be plated at the same time within the current call as within the prior call.

Whether or not a DTMF tone is sent to the incoming call, the recording of the call is compared to previously recorded calls based on respective characteristics of the call or of the calling party, at step 375. An audio response is selected which audio response is expected to keep the calling party on the phone for the longest duration at step 380, and the selected audio response is played into the call at step 385.

Stated differently, in embodiments of the disclosed technology, a telemarketer is kept on the phone as long as possible by playing a "robo-answer" as a countermeasure to a robocall or even a live operator telemarketer as a calling party to a telephone call. Multiple conversations between calling parties who are indicated to be telemarketers and called parties are recorded (which includes recordings of simulated called parties, e.g. the recording is of a called party to a hypothetical phone call). Then another phone call is received and determined to be from a telemarketer. The recorded audio of a called party is then played into this another phone call.

If only one recording of a previous call is available, it will be played and this is considered to be an audio response which will keep the calling party on the line the longest and the steps of comparing and selecting will be considered to have been satisfied. When there are multiple audio recordings to choose from, the selection at step 380 is carried out based on trial and error or overlapping of voice signatures/audio/text transcript (using a speech to text recognition engine, in real-time) or otherwise between the two calls. Especially if the calling party is identified to be the same between two calls, the audio from a first of the two calls will be used on the second in embodiments of the disclosed technology. The audio selected to be played into the current phone call is selected from a plurality of such recorded audio based on which is deemed most likely to keep the telemarketer of the another phone call communicating within the phone call for a longest amount of time. The more time it takes per call from a telemarketer and the less reward (and more annoyance) to the telemarketer, the less likely a telemarketer is to make future calls.

At step 380, audio is determined to be most likely to keep the telemarketer of the current phone call communicating for the longest amount of time is based on one or more of: a match between an audio signature of the calling parties, and/or accumulated statistics (at least three calls where the audio was used) of call length for a particular recoded audio of one of a called party of said called parties.

In some embodiments, the audio played can be looped over and over to the calling party, while in other embodiments following playing of the audio one time to the calling party the call is disconnected at step 390. "Real-time" for purposes of this disclosure is defined as, "as fast as processors used to carry out the act are able to provide the results" and/or "while a call is active such that the results can be used to provide data into audio of the call."

The audio played to the unwanted caller can be actual audio from a prior phone call from this or another unwanted caller. Audible interactions (audio generated between a calling party and called party) of at least one prior phone call can be recorded, for example at step 360 of a previous call. Then, in some embodiments of the disclosed technology, it is this audio which is then played into the call. That is, the prior recorded audio (generated by the called party only) from an actual phone call is played into another call determined to be unwanted, in embodiments of the disclosed technology.

Simultaneous to, or after, recording the audio at step 360, step 320 is carried out to compare the audio to stored audio or audio signatures. The audio signatures (or audio) are associated together in step 325 to get a broader dataset for unwanted callers, to better recognize such unwanted callers in the future.

Figure 1:
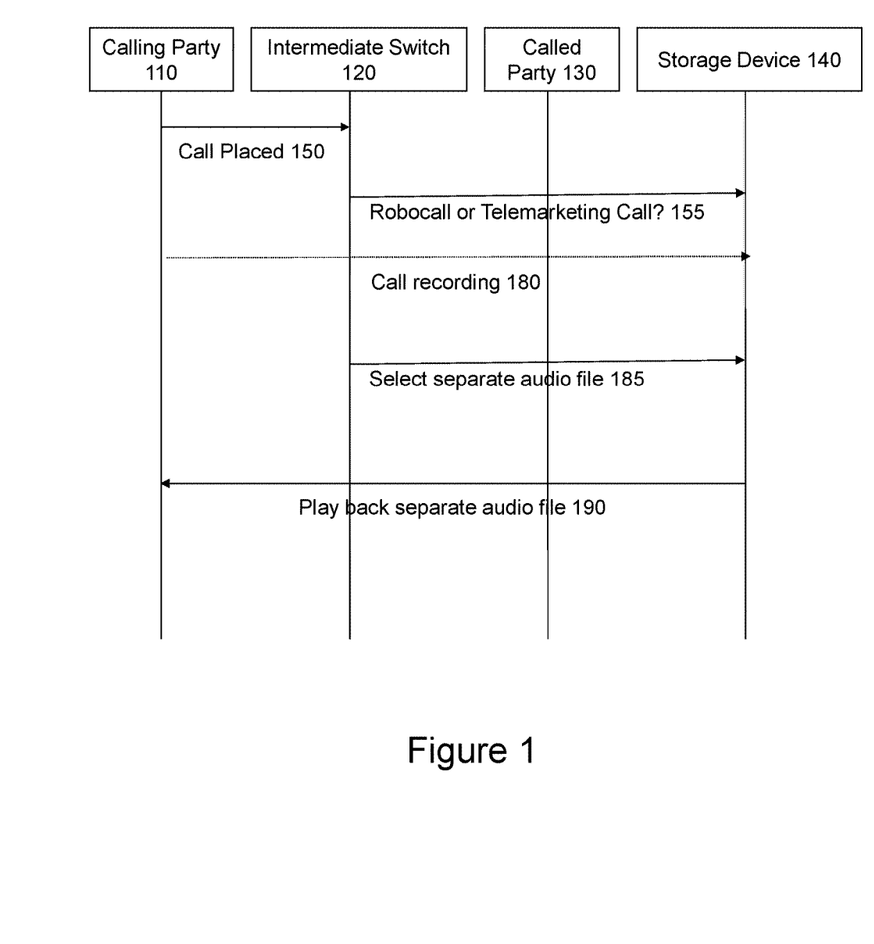
FIG. 1 shows a diagram of steps taken when a received call is unwanted, in an embodiment of the disclosed technology.

Now turning to FIG. 1, FIG. 1 shows a diagram of steps taken when a received call is unwanted or a robocall or telemarketing call, in an embodiment of the disclosed technology. A calling party 110 is one who initiates a call to an intended called party 130. The intermediate switch 120 is a telecommunications switch through which the call must pass before being connected to the called party 130. The telecommunications switch processes calls to a DID (direct inward dialing) number, in embodiments of the disclosed technology. The storage device 140, as described in FIG. 5, is a magnetic, optical, or other storage device used to store and recall database entries and used, in conjunction with a processor, to determine how to handle a phone call. A calling party places a call 150 which is connected to a specific intermediate switch 120. The intermediate switch, and in some embodiments thereof a call analysis engine forming part of the intermediate switch, determines if the call is a robocall or a telemarketing call in step 155 by accessing a storage device (and carrying out steps shown and described with respect to FIG. 3). In the method shown in FIG. 1, the call is determined to be a telemarketing call, meaning that it is an unwanted call which is not on the list of callers pre-approved by the called party 130. As such, the call is recorded by a call recording mechanism of the switch at step 180 and the recording or audio signature is sent to the storage device 140.

Additionally, at step 185, the switch selects from the storage device 140 a separate audio file which is predicted to cause the calling party to remain on the telephone call longer than other audio. The separate audio file may be a previously recorded telephone call which has been recorded by the call recording mechanism, and at step 190 the selected audio file is played back to the calling party of the call.

Figure 2:
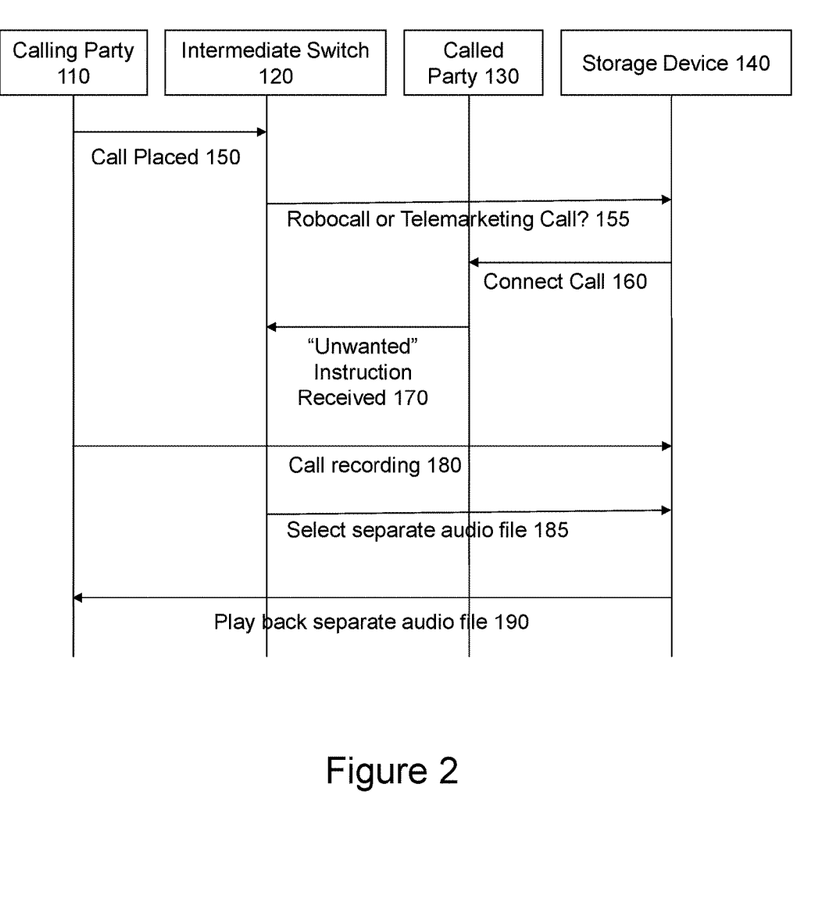
FIG. 2 shows a diagram of steps taken when a call is received by a called party but subsequently designated as unwanted, in an embodiment of the disclosed technology.

FIG. 2 shows a diagram of steps taken when a call is received by a called party but subsequently designated as unwanted, in an embodiment of the disclosed technology. Where numbered elements are the same, elements of FIG. 1 remain the same as that of FIG. 2. Here, after step 155, the call is determined as a wanted/desired call, as the caller either passed the challenge stage and entered the proper input, or such a step was not carried out because either the caller had previously been verified or simply because the called party elected not to use such a feature. Therefore, the call is determined as "wanted," or simply proceeds from the calling party 110 to the called party 130 through the intermediate switch 120. When conducting a database lookup from the storage device 140 in making the determination of a call being "wanted," the call is connected to the called party in step 160. From there, the called party 130 may decide, or realize, that the call is from a telemarketer or other unwanted party. The called party 130 then gives an "unwanted" instruction to the intermediate switch 120 in step 170. This instruction may be sent in the form of a stated phrase (such as "wow, tell me more"), entered code on the telephone keypad, or code provided by an alternative route (button on a soft phone [computer emulation of a phone] or specific button on a specialized phone). Once the code is received, the calling party is disconnected from the called party 130 and is passed, at least, to the storage device 140, where the rest of the call, or call up to this point, or both, is stored for later retrieval and analysis when comparing the audio or audio signature to future calls. As such, this audio or audio signature may be used to make better determinations about the wanted or unwanted status of future calls. Additionally, as described hereinabove, a separate audio file is selected and is played back to the calling party to keep the calling party on the phone for as long as possible.

Figure 4:
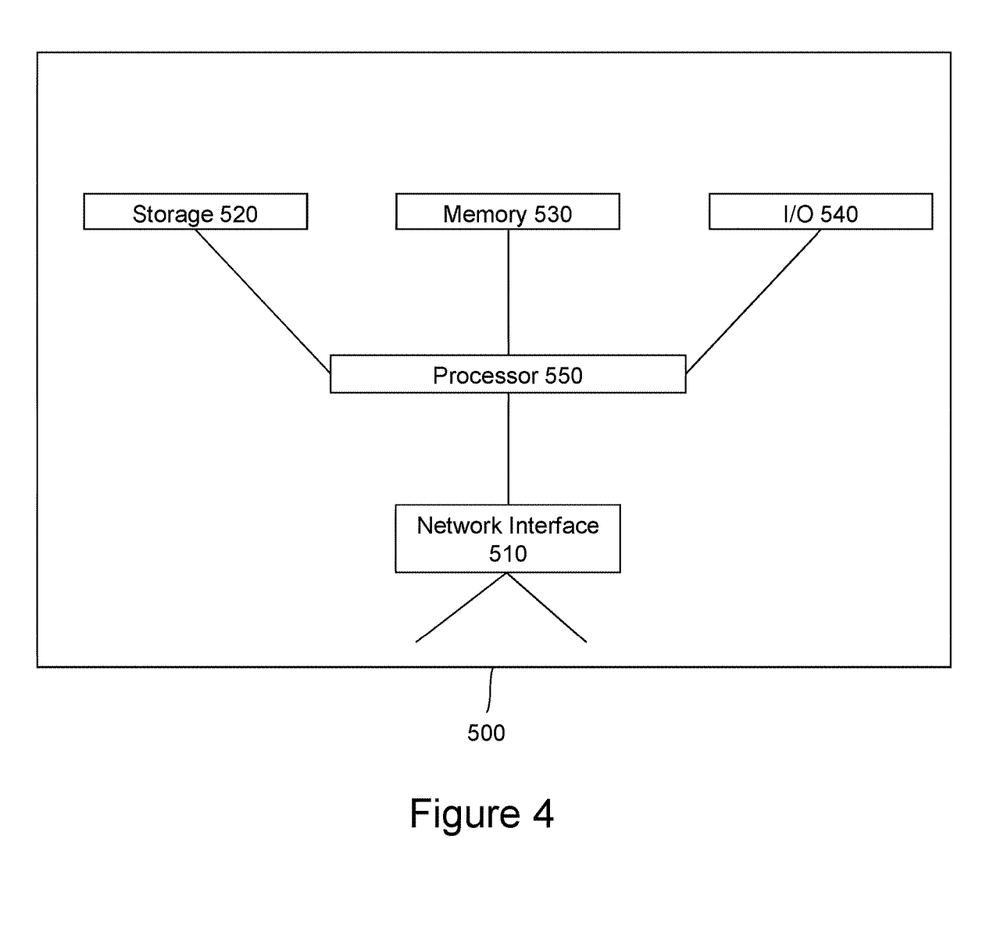
FIG. 4 shows a high-level block diagram of a device that may be used to carry out the disclosed technology.

FIG. 4 shows a high-level block diagram of a device that may be used to carry out the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions. A device 500 also includes one or a plurality of input network interfaces for communicating with other devices via a network (e.g., the internet). The device 500 further includes an electrical input interface. A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device for illustrative purposes. It should also be understood by one skilled in the art that the method and devices depicted in FIGS. 1 through 3 may be implemented on a device such as is shown in FIG. 4.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A method of handling an incoming call, comprising the steps of:
    determining that said incoming call is an unwanted call;
    locating at least one prior call of a plurality of prior calls wherein characteristics of a calling party in said at least one prior call match that of said unwanted call and said prior call is a separate call made at a prior time before, and is distinct from, said incoming call;
    determining an audio response which kept said calling party in said prior call longest, wherein said determining is based on a selection of said audio response from multiple audio recordings made for said plurality of prior calls from said calling party to a called party; and
    playing, at least in part, said audio response which kept said calling party in said prior call longest in said unwanted call.

2. The method of claim 1, wherein said determining that said incoming call is an unwanted call is determined based on at least some audio within said incoming call matching that of said at least one prior call of said plurality of prior calls which was indicated by a called party thereof to be an unwanted call.

3. The method of claim 1, wherein said determining that said incoming call is an unwanted call is determined based on sending, in real-time, audio from a calling party generating said incoming call, through a speech to text engine and determining that said text comprises strings which match that of telemarketers.

4. The method of claim 1, wherein said characteristics comprising which match include at least two of:
    calling line identification match;
    automatic number identification match;
    voice signature match; and
    matching transcript, at least in part.

5. The method of claim 3, wherein said text comprises instructions to press a number to reach a live operator and during said incoming call a DTMF tone corresponding to said number is sent to said calling party at a time which was previously determined to keep said calling party in said prior call a longest amount of time.

6. The method of claim 1, comprising the following additional steps:
    receiving said at least one prior call of said plurality of prior calls;
    receiving audible interactions between said calling party and a called party of said at least one prior call; and
    using audio recorded from said called party of said at least one prior call in said step of playing into said incoming call, said incoming call occurring after said prior call ended.

7. A method of keeping a telemarketer of a plurality of telemarketers on the phone as long as possible, comprising the steps of:
    recording multiple conversations between calling parties who are indicated to be telemarketers and called parties;
    receiving another phone call which is determined to be from said telemarketer; and
    playing from one of said multiple conversations recorded audio of a called party of said called parties in said another phone call, said another phone call being initiated after said step of recording ends;
    wherein said playing recorded audio is audio determined to keep said telemarketer of said another phone call communicating within said phone call for a longest amount of time as compared to any call time spent in any other prior calls made from said telemarketer to said called party.

8. The method of claim 7, wherein said audio determined to be most likely to keep said telemarketer of said another phone call communicating for said longest amount of time is determined based on, at least, a match between an audio signature of said calling parties.

9. The method of claim 8, wherein said audio determined is further based on, in part, accumulated statistics of call length for a particular recoded audio of one of a called party of said called parties.

10. The method of claim 7, wherein said recorded audio comprises, or audio played additionally includes, playing a DTMF tone at a specific time in said phone call based on a determination that playback at said specific time will result in one or both of keeping said calling party in said call longest and reaching a live operator.

11. The method of claim 10, wherein said recorded audio is played to said called party only after at least one said DTMF tone is played into said another phone call and it is determined that said live operator is reached.

12. A phone network switch adapted to keep a plurality of telemarketers on a phone connection as long as possible, comprising:
    an input receiving a plurality of phone calls;
    a call analysis engine determining which of said plurality of phone calls are a plurality of prior calls made from said plurality of telemarketers and determining an audio response which kept one telemarketer of said plurality of telemarketers in one prior call of said plurality of prior calls longest;
    a call recording mechanism creating a multiple audio recordings made for said prior calls from said telemarketer to a called party;
    wherein said determining of said audio response is based on a selection of said audio response from said multiple audio recordings; and
    an audio playback mechanism which plays back said audio response which kept said telemarketer in said prior call longest.

13. The phone network switch of claim 12, further comprising a speech to text mechanism which transcribes audio from said telemarketer to a text transcription; and
    wherein said prediction is based on keywords found in said text transcription which match keywords found in said text transcription.

14. The phone network switch of claim 12, further comprising a DTMF tone generator or a recorded DTMF playback mechanism, wherein using same:
    a DTMF tone is sent to a telemarketer of a new call responsive to a request to enter a number into said new call; and said request to enter a number into said new call determined based on a speech to text mechanism creating a real-time transcription of said new phone call.

15. The phone network switch of claim 12, wherein said input receiving a plurality of phone calls receives at least some of said plurality of phone calls by way of call forwarding from third parties who forward said at least some of said plurality of phone calls as a result of indicating that a call of said plurality of phone calls is from a telemarketer.

16. The phone network switch of claim 12, wherein said call analysis engine determines that a call of said plurality of phone calls is from a telemarketer based on said indicating from a third party of said third parties who forward.

* * * * *